United States Patent
Jullian et al.

(10) Patent No.: US 6,251,165 B1
(45) Date of Patent: Jun. 26, 2001

(54) PROCESS FOR ADSORBING AND DESORBING A SOLVENT CONTAINED IN A NATURAL GAS FROM A DEHYDRATION PROCESS

(75) Inventors: Sophie Jullian; Etienne Lebas; Michel Thomas, all of Rueil-Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 0 days.

(21) Appl. No.: 09/323,841

(22) Filed: Jun. 2, 1999

(30) Foreign Application Priority Data

Jun. 2, 1998 (FR) .................................................. 98 06933

(51) Int. Cl.$^7$ ............................. B01D 53/04; B01D 53/14
(52) U.S. Cl. ................................. 95/115; 95/143; 95/231
(58) Field of Search .................................. 95/41, 42, 114, 95/115, 141, 143–145, 147, 231

(56) References Cited

U.S. PATENT DOCUMENTS

| | | | |
|---|---|---|---|
| 2,632,726 | * 3/1953 | Ringham et al. | 95/143 X |
| 3,007,543 | * 11/1961 | Maher | 95/143 X |
| 3,055,157 | * 9/1962 | Lavery et al. | 95/143 X |
| 3,989,478 | * 11/1976 | Jones | 95/41 X |
| 4,043,770 | * 8/1977 | Jakob | 95/115 X |
| 4,409,102 | * 10/1983 | Tanner | 95/42 X |
| 5,137,548 | * 8/1992 | Grenier et al. | 95/41 |
| 5,152,812 | * 10/1992 | Kovach | 95/41 |
| 5,536,301 | * 7/1996 | Lansbarkis et al. | 95/141 X |
| 5,855,650 | * 1/1999 | Kalbassi et al. | 95/115 X |

FOREIGN PATENT DOCUMENTS

| 2605241 | 4/1988 | (FR) . |
|---|---|---|
| 2636857 | 3/1990 | (FR) . |

* cited by examiner

Primary Examiner—Robert H. Spitzer
(74) Attorney, Agent, or Firm—Antonelli, Terry, Stout & Kraus, LLP

(57) ABSTRACT

Process for recovering a solvent from a gas coming from a treating process using the solvent, the gas having a low temperature Ta and a high temperature Td, the difference Td-Ta being sufficient to carry out an adsorption step and a desorption step. The process is characterized in that/ a) a first solvent-containing gas stream is sent to an adsorption step, this gas being at a temperature Ta, at the end of this step the gas is practically solvent-free and the solvent is collected in a first adsorber, b) a second gas stream at a temperature Td, this gas being solvent-free, is sent to carry out desorption of a second adsorption means loaded with solvent during a previous step a), and c) the solvent is sent at least partly to a step of the treating process using the solvent.

19 Claims, 3 Drawing Sheets

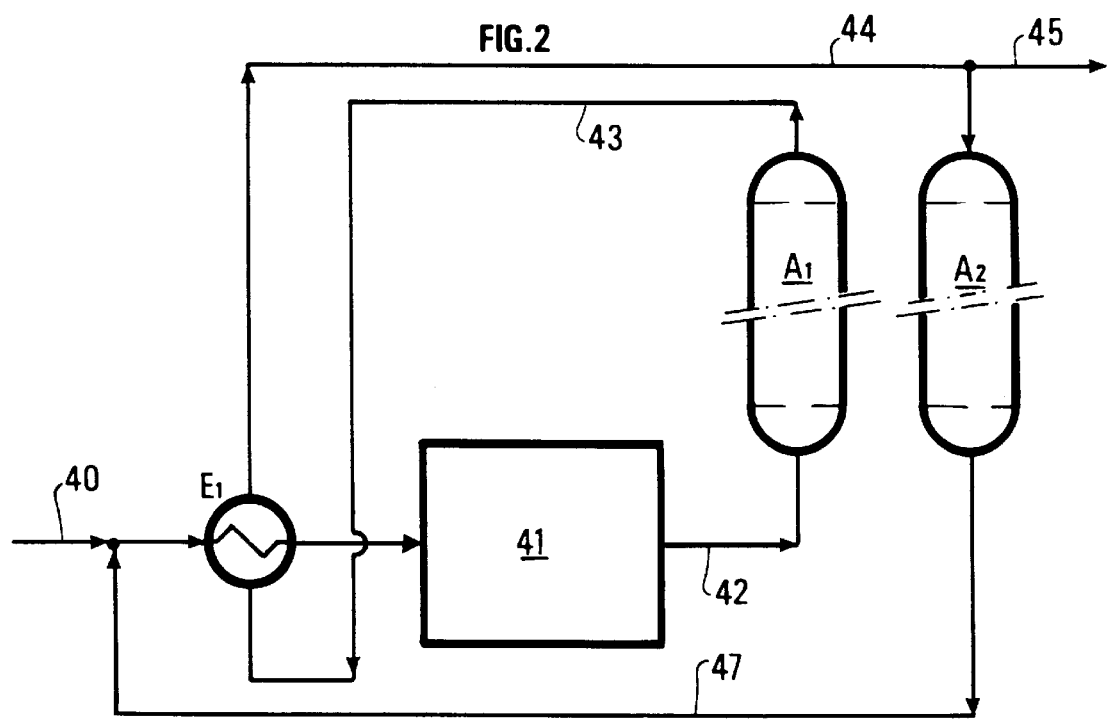
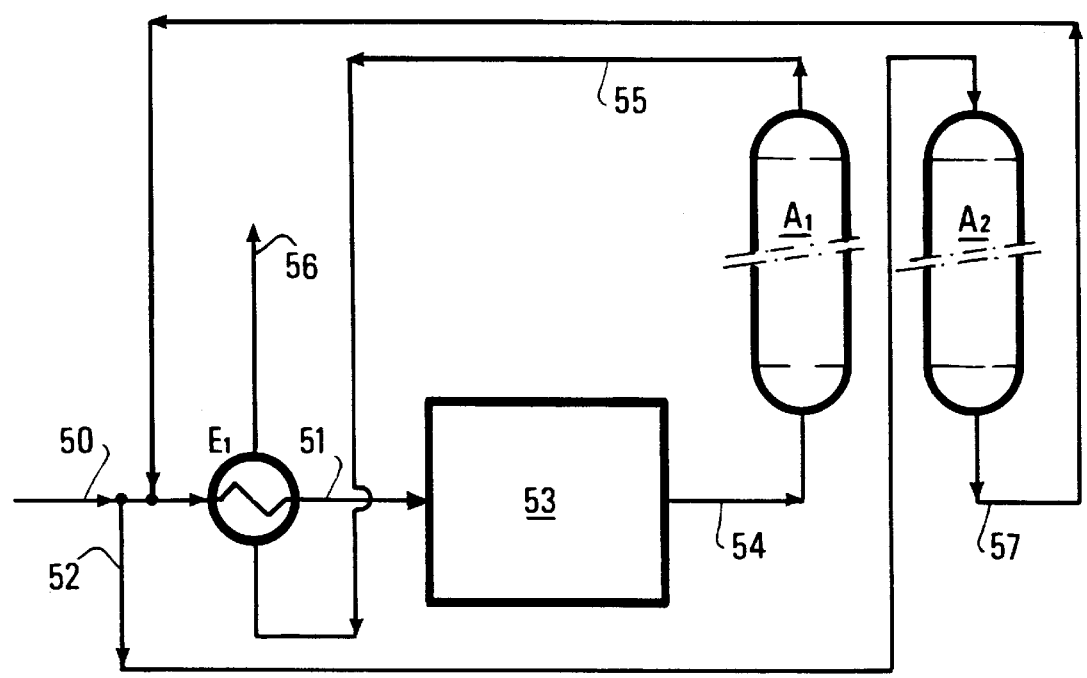

PROCESS FOR ADSORBING AND DESORBING A SOLVENT CONTAINED IN A NATURAL GAS FROM A DEHYDRATION PROCESS

FIELD OF THE INVENTION

The present invention relates to a solvent recovery process integrated in a gas treating process, the gas, processed or not, can be at least at two temperatures, the difference between these two temperatures being sufficient to ensure the adsorption and desorption operations required for recovery of the solvent.

The process according to the invention is applied for recovering the solvent used in a process for treating a gas containing methane, at least one higher hydrocarbon and water, the aim of the treatment being notably to eliminate the water and/or to extract the higher hydrocarbons.

The process according to the invention applies to any gas treating process using a solvent, during which the gas loads with solvent, and it can have at least two temperature values, the difference between these two temperatures being sufficient to ensure adsorption and desorption operations in order to recover the solvent from the processed gas. The two temperatures are referred to as low temperature and high temperature in the description hereafter.

The process according to the invention advantageously allows to reach additional gains in the operating costs linked with the processing of the gas and to improve the recovery of condensates.

Solvent losses in the gas can lead operators, in the case of offshore processing for example, to consider low-temperature scrubbing processes to be uneconomical. In fact, the costs induced by solvent supply can be very high.

Furthermore, in order to comply with specifications linked with the standards of use, the solvent content in the processed gas, a dehydrated gas for example, can be limited.

The process according to the invention advantageously allows to carry out operations of dehydration and separation of at least part of the condensable hydrocarbons included in the natural gas, within an integrated and optimized process, on account of the recycling of the solvent.

It is also applied in natural gas treating processes in which the solvent used allows to eliminate unwanted constituents such as hydrogen sulfide and/or carbon dioxide.

BACKGROUND OF THE INVENTION

The prior art describes various gas treating processes.

For example, in the claimant's patent FR-2,605,241, the process describes the treatment of a gas using a refrigerated solvent, during which all of the processing operations are carried out: dehydration alone, or associated with extraction of the higher hydrocarbons and/or elimination of the acid gases possibly present.

Another patent registered by the claimant, FR-2,636,857, discloses a process comprising a step of separation of the higher hydrocarbons (NGL in a shortened form), where the solvent can be recovered by washing the liquid hydrocarbons with the water resulting from the dehydration of the gas.

SUMMARY OF THE INVENTION

The present invention proposes a new process allowing to recover the solvent carried along by the processed gas in order to use it again in the gas treating process. The process according to the invention advantageously uses the temperature difference of the gas taken at two points of the treating process in order to carry out the adsorption and the desorption steps performed with suitable devices for recovering the solvent.

The invention relates to a process for recovering a solvent from a fluid such as a gas coming from a treating process using said solvent, the treating process allowing to obtain the gas at two different temperatures, a low temperature, Ta and a high temperature Td, so that the temperature difference Td-Ta is sufficient to perform an adsorption step and a desorption step.

It is characterized in that a) a first solvent-containing gas stream is sent to an adsorption step, said gas being at a temperature Ta, after this adsorption step the gas is practically solvent-free and the solvent is collected in a first adsorption means, b) a second gas stream at a temperature Td, said second gas stream being solvent-free, is sent to carry out desorption of a second adsorption means loaded with solvent during a previous step a), and c) said solvent is recovered and sent at least partly to a step of the treating process using the solvent.

The adsorption means comprise for example adsorbent beds.

According to an embodiment, the second gas stream consists for example of at least part of the gas from step a), said gas having been heated by heat exchange with at least part of the gas to be treated so as to bring its initial temperature close to Ta to a temperature substantially equal to Td.

According to another embodiment, the second gas stream can consist of part of the gas to be treated diverted prior to being subjected to the solvent treating process.

Temperature Td will be obtained by using additional heating means.

The invention also relates to a solvent recovery process integrated in a natural gas treating process using a solvent wherein the natural gas loads with solvent and can be at two temperatures Ta and Td.

It is characterized in that it comprises at least the following steps:

a) the gas to be processed is contacted with a mixture comprising at least one solvent and a gas enriched in solvent is obtained at the end of this step, b) said solvent-enriched gas is sent to a refrigeration step in order to bring its temperature to a temperature Ta, c) said solvent-containing gas at a temperature Ta is sent to an adsorption step in a first adsorption means at the outlet of which a practically solvent-free gas is obtained, d) a step of desorption of a second adsorption means already loaded during a previous adsorption step is carried out by sending a practically solvent-free gas stream at a temperature Td, the temperature difference between Ta and Td being sufficient to carry out the desorption step so as to recover the solvent, e) the solvent recovered is sent to a step of the gas treating process.

The gas stream used in step d) is for example withdrawn before contacting step a) and the as from step a) is discharged after being used to cool the solvent-rich gas to a temperature substantially close to Ta.

This gas stream used for step d) corresponds for example to a fraction of the gas from adsorption step c), said gas having been heated to a temperature Td by heat exchange with the solvent-rich gas.

Temperature Ta is selected, for example, in the [−60, 25°C] range and preferably in the [−30, 0°C] range.

The value of temperature Td can be selected in the [0, 100°C] range and preferably in the [25, 50°C] range.

The value of temperature Td can be obtained by using additional heating means.

Steps c) and d) can be operated at a pressure value ranging between 0 and 20 MPa and preferably between 3 and 10 MPa.

All of the solvent recovered can for example be sent with the gas to one of the treating steps of the process.

A solvent allowing dehydration of a natural gas can be used, dehydration of the natural gas can be achieved and a mixture of solvent recovered and of natural gas can be reinjected before heat exchange.

Adsorbents such as silicalite, Y type zeolites, a hydrophobic sieve or activated charcoal can be used for example.

The process according to the invention is applied to recover a solvent contained in a gas, the concentration of said solvent ranging between 0 and 500 ppm, preferably between 0 and 200 ppm.

The process according to the invention advantageously allows to recover the natural liquefied gas (NLG), such as the $C_3+$.

Integrated in a dehydration process, it allows to independently fix the dew point values for the hydrocarbons and the water. The temperature of the cold drum will be fixed to reach the desired hydrocarbon specification whereas the dew point for the water will be done with the adsorbent. The advantage of this procedure is that the temperature of the cold drum does not have to be lowered too much.

BRIEF DESCRIPTION OF THE DRAWINGS

Other features and advantages of the method according to the invention will be clear from reading the description hereafter of non limitative examples of process layouts, where.

DETAILED DESCRIPTION OF THE INVENTION

The idea of the process according to the invention consists in recovering a solvent carried along by a gas during a treating process, by using a set of adsorbent beds working at two temperature values taken by the gas during the treating process, referred to as Ta and Td respectively, in order to carry out a step of adsorption of the solvent contained in the gas and to carry out a step of desorption of the device that has adsorbed the solvent, by using the gas practically totally free of solvent.

The difference between the two temperature values Ta and Td is such that it allows to carry out the adsorption and desorption steps.

A first solvent-containing gas stream at a temperature Ta is thus sent to an adsorption step and a second gas stream, free of solvent and at a temperature Td, is used to desorb the device that has previously collected the solvent.

The solvent recovered is then recycled to a gas processing step.

Figure 1:
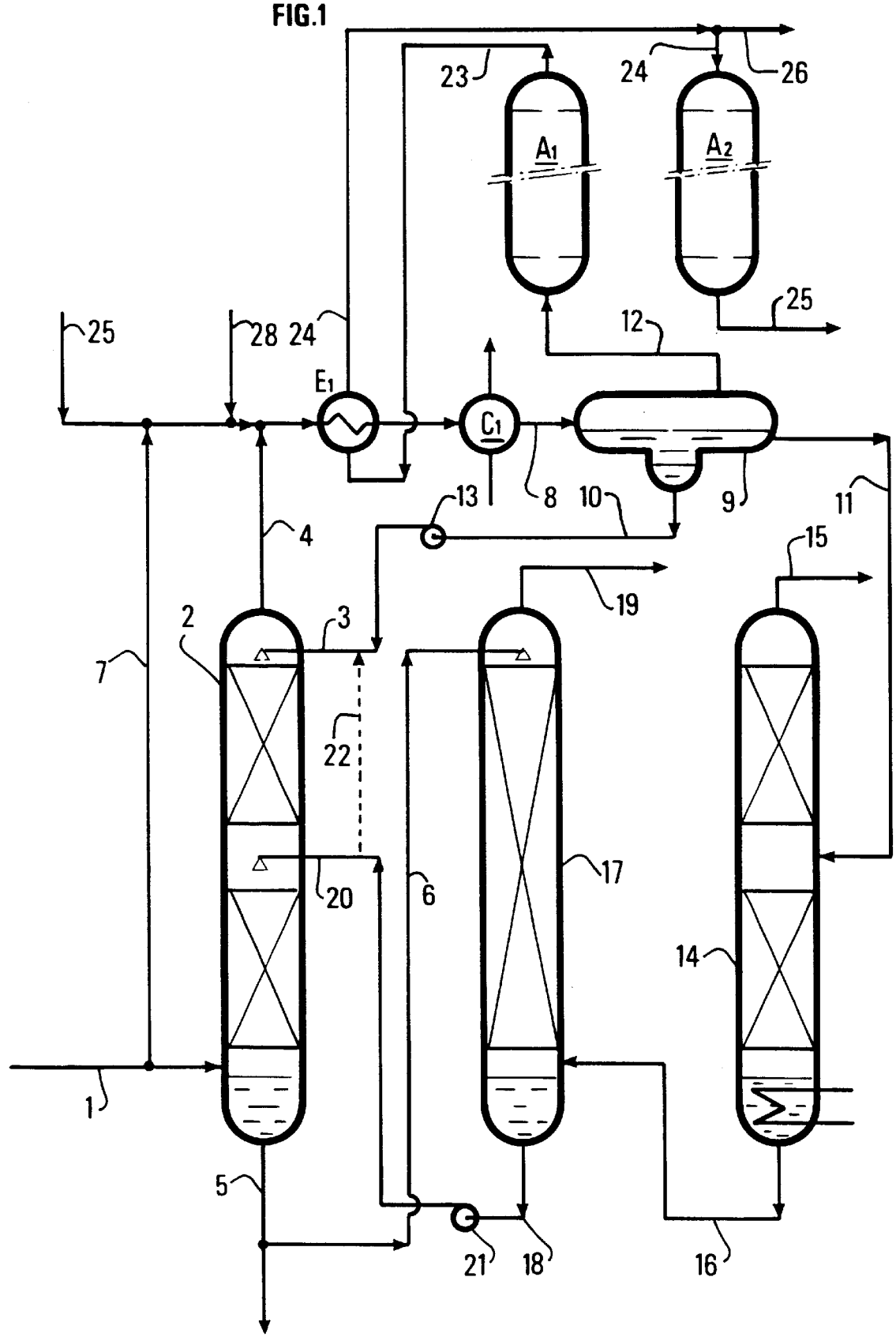
FIG. 1 shows a first example of implementation of the process according to the invention integrated in a natural gas dehydration process using a refrigerated solvent, FIG. 2 schematizes a generalization of the process described in FIG. 1, integrated in other treating processes.

FIG. 1 shows, by way of non limitative example, the application of the process according to the invention to the recovery of the refrigerated solvent used for dehydrating a natural gas.

The steps of the dehydration process can be identical to those given in the claimant's patent FR-2,605,241.

The natural gas to be dehydrated flows in through line 1. A fraction or all of this gas is contacted in a contact zone 2 with a mixture of solvent and of water introduced through line 3. The contact zone can consist of a packing.

This contact zone is equipped:
  at the top, with a line 4 allowing discharge of the solvent-enriched natural gas,
  at the bottom, with a line 5 allowing to extract the solvent-freed water.

The solvent-containing natural gas is sent through line 4 to a heat exchanger $E_1$, then to a condenser $C_1$. At the outlet of this condenser, the mixture of gas phase and of liquid phase is thereafter sent through a line 8 to a separating drum 9 provided with at least three lines 10, 11 and 12.

A fraction of the non-processed gas can be diverted from the contact zone and be directly sent to another step of the treating process by means of a lihe 7, for example directly to exchanger $E_1$ and condenser $C_1$.

The solvent-containing processed gas is at a temperature Ta, preferably a low temperature, after passing through exchanger $E_1$.

Line 10 allows to extract an aqueous phase that is recycled to contact zone 2 by means of a pump 13 and reintroduced through line 3.

Line 11 situated in the lower part of drum 9 and above line 10 is used for extracting the liquid hydrocarbons that are sent to a stabilization column 14.

Inside stabilization column 14, the most volatile components $C_1$ and $C_2$ are separated from the liquid hydrocarbon phase and discharged at the top through a line 15. The liquid hydrocarbon phase comprising the constituents of higher molar mass than $C_2$ is sent through a line 16 to a water washing column 17 in order to remove the solvent therefrom.

The wash water of the hydrocarbon phase can be water freed of solvent during the contacting step, which is extracted through line 5 and introduced through a line 6. The solvent having more affinity with water than with the hydrocarbon phase is recovered at least partly in the aqueous phase from this step and extracted through a line 18 at the bottom of the column.

The solvent-containing aqueous phase can be sent through line 18 and a pump 21 to contact zone 2. According to its solvent content, it can be injected either directly into the contact zone through line 20 or mixed with the aqueous phase extracted from drum 9 through a line 22 shown by dotted lines in the figure.

At the top of water washing column 17, the liquid hydrocarbon phase freed of most of the solvent is recovered through a line 19.

Line 12 situated in the upper part of the separation drum allows to discharge a dehydrated solvent-containing gas phase.

This gas phase is at a low temperature Ta that is substantially equal to the temperature of the gas at the outlet of condenser $C_1$. This solvent-containing gas phase is then sent to the recovery cycle.

The recovery cycle uses the TSA (temperature swing adsorption) principle. It comprises at least two adsorption units $A_1$ and $A_2$ comprising adsorption means such as adsorbent beds, these units working alternately in adsorption and desorption mode.

In some cases, it is possible to add a third unit used as a reserve bed so as to completely saturate an adsorption bed prior to regenerating it, i.e. prior to extracting the solvent.

Such a layout can be interesting notably when the mass transfer zone occupies a large fraction of the bed.

In the example given in FIG. 1, the solvent recovery step will comprise a solvent adsorption step in device $A_1$ and a solvent desorption step in device $A_2$, this solvent having been adsorbed during a previous adsorption step.

Solvent adsorption is carried out at a low temperature Ta, preferably at the temperature of cold drum 9 or at a slightly higher temperature, and at the pressure of drum 9. The solvent concentration in the gas that is fed into adsorber $A_1$ typically ranges between 50 and 250 ppm by moles.

The gas coming from the cold drum is sent to first adsorber $A_1$ where it is depleted in solvent, then it is extracted through a line 23. It is at a temperature substantially close to Ta at the adsorber outlet and it can be sent to heat exchanger $E_1$ where it is heated by heat exchange with the solvent-containing processed gas from contact zone 2. During this heat exchange, the solvent-free gas heats up to a temperature Td that is sufficient for desorption of the second adsorber $A_2$.

A first fraction of the solvent-free gas is brought to a temperature Td and sent through a line 24 to adsorber $A_2$. The passage of this gas fraction in adsorber $A_2$ causes the solvent(s) that had been previously adsorbed to be carried along. Regeneration of the adsorber in adsorber $A_2$ is performed at the same pressure as the adsorption step. The gas coming from adsorber $A_2$ contains a solvent concentration that is generally higher than that of the gas from drum 9. The mixture of gas and of solvent is discharged from adsorber $A_2$ through a line 25 in order to be recycled and mixed with the solvent-rich non-processed gas extracted from the contact zone, through line 4.

This gas fraction is typically 5 to 20 % of the volume of the gas, preferably 10 %.

A second gas fraction is discharged through a line 26 and constitues the processed gas.

In this embodiment, the process uses the temperature difference between the gas flowing from the contact zone and the gas flowing from the drum.

Without departing from the scope of the invention, it is possible to obtain temperature Td by using auxiliary heating means situated on the delivery lines of adsorbers $A_1$ or $A_2$. The temperature required for the desorption step is thus obtained.

For this embodiment, the adsorbent used will preferably be an activated charcoal or a hydrophobic zeolite such as silicalite (MIFI structure), or a dealuminized Y zeolite. Examples of materials used as adsorbents are given in general terms at the end of the description.

The means allowing alternate operation of adsorbers $A_1$ and $A_2$, such as valves, have not been detailed in the figure for simplification reasons. Furthermore, they are known to the man skilled in the art. This also applies to all the examples given in the description.

In general, the amount of solvent carried along by the gas in the contact zone is sufficient to prevent formation of hydrates linked with the cooling in exchanger $E_1$ and condenser $C_1$. Makeup solvent can however be supplied through a line 28, notably to compensate for the solvent losses in the processed gas, in the liquid hydrocarbon fraction (NGL) and possibly in the water discharged through line 6.

FIG. 2 diagrammatically illustrates the principle implemented in the dehydration process described in FIG. 1, that can be integrated in all the treating processes where a solvent is used for processing a gas, and for which a practically solvent-free gas at a temperature Td and the solvent-enriched processed gas at another temperature Ta, high temperature and low temperature respectively, are available, the temperature difference being used to carry out the adsorption steps and the desorption steps.

The adsorption step is carried out at a temperature Ta and allows to obtain a practically solvent-free gas that will be heated to temperature Td to partly carry out desorption step d).

The temperature difference between Td and Ta must be sufficient to carry out the adsorption and desorption steps in an adsorber.

Schematically, the gas to be processed is sent through a line 40 to heat exchanger $E_1$ where it is cooled prior to being sent to a treating process 41. After the treatment, it is loaded with solvent and it flows out at a temperature Ta. This first gas stream is sent through a line 42 to adsorption unit $A_1$ where the solvent is extracted from the gas. At the outlet of this unit, a first solvent-free gas stream is sent through line 43 to heat exchanger $E_1$. This stream allows to cool the gas to be processed and it flows from heat exchanger $E_1$ through a line 44 and at a temperature Td. A first part of this stream is discharged through a line 45, whereas a second part is sent to second adsorption unit $A_2$ that has been used for a previous adsorption cycle to collect the solvent contained in a gas and that contains solvent to be recovered. The passage of this second gas stream at a temperature Td allows to recover the solvent that is discharged with the gas through line 47 and recycled before the processing plant.

The processing plant can be a dehydration plant, a gasoline recovery plant, a deacidizing plant or any other treating process where the gas loaded with a treating agent can be found at a temperature Ta and the agent-free gas at a temperature Td, the to difference between Ta and Td being such that an adsorption step and a desorption step can be carried out.

Figure 3:
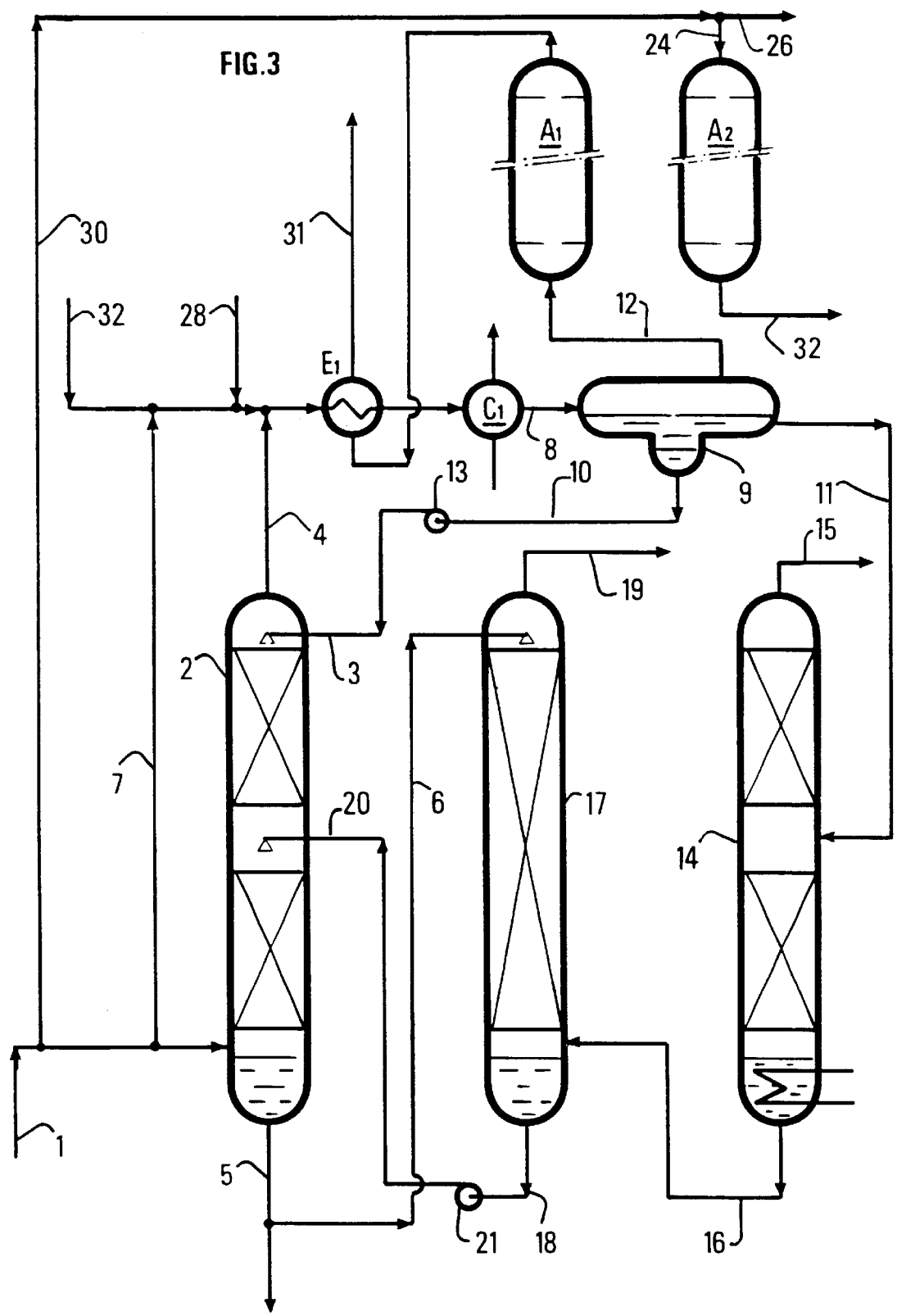
FIG. 3 shows a second example of application of the process described in FIG. 1, and FIG. 4 generalizes the principle given in FIG. 3 for various treating processes.

FIG. 3 schematizes a second variant of the process using a fraction of the diverted gas that does not flow through the contact zone as the carrier gas or scavenging gas for the desorption step. This gas is saturated with water and is at a temperature substantially equal to Td. In any case, it is at such a temperature that the difference between this temperature and the temperature Ta of the solvent-containing gas from the drum is sufficient to allow adsorption and desorption operations according to a principle identical to that described in FIG. 1.

A first fraction of the gas to be processed is sent through line 1 to the contact zone, whereas a second gas fraction is directly sent to an adsorption device through a line 30. The second fraction is at a temperature substantially close to Td.

The gas introduced through line 30 in adsorption device $A_2$ allows to perform desorption of the adsorbent loaded with solvent during a previous adsorption step carried out at a temperature Ta. At the outlet of $A_2$, a line 32 allows a mixture of gas and of solvent to be sent back to the treating process with the processed gas coming from contact zone 2 through line 4.

In this example, the non-processed gas coming from device $A_1$ after the adsorption step is sent to heat exchanger $E_1$ where it is used to cool the solvent-rich gas from the contact zone, then it is discharged through a line 31.

In this embodiment variant, the adsorbent used will preferably be a hydrophobic zeolite such as silicalite (MFI structure), a dealuminized Y zeolite or an activated charcoal.

FIG. 4 diagrammatically shows the particular example given in FIG. 3, applied to various process types, dehydration processes, deacidizing processes for example . . .

The gas to be processed flows in through a line 50. A first fraction of this gas is sent through a line 51, after passing through heat exchanger $E_1$ where it is cooled, to processing plant 53. At the outlet of the processing plant, the gas stream is loaded with solvent and it is at a temperature Ta. This first stream is sent through a line 54 to adsorption unit $A_1$, after which it is discharged, solvent-free, through a line 55 to be used as a cooling agent in exchanger $E_1$. After heat exchange, it is produced through a line 56. A second gas fraction at a temperature Td is sent through a line 52 to desorption unit $A_2$ where it is used as a desorption agent. The gas carries the solvent contained in $A_2$. The stream comprising the gas and the recovered solvent is then sent through a line 57 before heat exchanger $E_1$. Temperature Td must be such that the temperature difference between Ta and Td is sufficient to carry out the adsorption and desorption steps.

In the examples given in FIGS. 1 to 4, the values of the operating parameters are for example selected in the following value ranges:

The temperature Ta required for the adsorption step will preferably be in the [−60; 25°C] range, and preferably in the [−30 ; 0°C] range.

The temperature Td at which the desorption process is performed belongs to the [0; 100°C] range and preferably to the [25 ; 50°C] range.

The adsorption and desorption steps are carried out at a pressure value ranging between 0 and 20 MPa, preferably between 3 and 10 MPa.

The process according to the invention finds its application for recovering a solvent from a gas, for example when the solvent concentration ranges between 0 and 500 ppm, and preferably between 0 and 200 ppm.

In the various implementation examples of the process according to the invention, adsorbers $A_1$ and $A_2$ are equipped with materials or adsorbents having the necessary properties for adsorbing a solvent and then releasing it under specific operating conditions, temperature, pressure, passage of a gas stream. These adsorbents can be presented in the form of beds.

Zeolites can be classified into two main families: hydrophilic type zeolites and hydrophobic type zeolites.

Examples of hydrophilic zeolites are notably A type zeolites (3A, 4A and 5A), used for gas dehydration for example, and X or Y type zeolites (10X, 13 X, . . . ) that are used for other separation types because they have larger cage aperture diameters than the latter. These adsorbents all have a very great affinity with the water present in the gas, and the presence of traces of water can notably limit the adsorption capacity of these sieves towards less strongly adsorbed hydrocarbon compounds for example.

Under a relative pressure of 0.2 and at 25°C, the amount of water adsorbed on 4A and 13X sieves is about 17 and 26 % by weight respectively, i.e. an amount close to the maximum adsorption capacity of the sieve, and for a solvent, for example a light alcohol such as methanol, at 25°C and under a relative pressure of 0.1 (i.e. about 1.5 kPa), the amount adsorbed on a 4A sieve is about 10.5 % by weight, and on a 13X sieve, about 21.5 % by weight (Carrott et al., *Characterization of Porous Solids II*, 1991,p.685; Simonot-Grange et al., *Proceedings of the* 5th *International Conference on Zeolites*, Italy, Napoli, Jun. 2 –6, 1980, p.832, Ed. L.V.C. Rees; Maachi et al., *J. Chimie Phys.*, 1978, 75(1), p.116).

The heat of adsorption of a molecule on an adsorbent shows the affinity of this adsorbate for the adsorbent considered ; the higher this heat of adsorption, the higher the adsorption. In the case of water and methanol, the values of the initial heat of adsorption on a 13X sieve are 22.7 and 19.5 kcal/mol respectively. This shows the greater affinity of water for the 13X sieve in relation to methanol. By comparison, the heat of adsorption of a hydrocarbon such as n-heptane is about 15 kcal/mol.

Regeneration of 4A and 13X sieves containing water and/or methanol must be achieved at high temperature because these species are strongly adsorbed.

Examples of hydrophobic zeolites are in particular dealuminized Y zeolites and MFI type zeolites (ZSM 5, silicalite) that all have a high Si/Al ratio (several ten to several hundreds, and infinite for silicalite). These compounds are little sensitive to the presence of water in the feed, all the less so as the Si/Al ratio is high. They nevertheless generally have (MFI type) a lower adsorption capacity than the zeolites belonging to the previous two families.

Under a relative pressure of 0.0and at 25°C, the amount of water adsorbed on a ZSM-5 zeolite and on silicate is 0.4 and 0.1 % by weight respectively (Carrott et al., op.cit.). Under a relative pressure of 0.5, the adsorption capacity of water by silicate is about 3 % by weight at 25°C, and about 2 % by weight at 60°C (Klein et al., *AIChE Symp.* Ser. No.230, Vol.79, 53). Concerning methanol, the amount adsorbed at 20°C under a relative pressure of 0.2 is about 3 % by weight (*Proceedings of the* 6th *International Conference of Zeolites,* Reno, USA, Jul. 10 –15, 1983, p.251, Ed. D. Olson and A. Bisio).

The heats of adsorption of silicate are about 6 to 10 kcal/mol for water and 11 to 17 kcal/mol for methanol. The heat of adsorption of n-heptane is about 17 kcal/mol. This shows the hydrophobic character of this adsorbent in comparison with the 13X sieve.

Regeneration of the ZSM-5 zeolites or of the silicate containing water or methanol can be achieved at moderate temperature because the adsorbed amounts are small and the molar compounds are more weakly adsorbed on these sieves.

The hydrocarbon-containing compounds of the gas may also be adsorbed on the silicate (Sun et al., *J. Phys. Chem.*, 1196, 100, p.17276). The saturation contents are of the order of 13 % by weight. The heat of adsorption is 10 to 20 kJ/mol respectively for pentane and heptane on silicate.

In some cases, the adsorbent can consist of a microporous solid.

Carbon-containing microporous solids such as activated charcoal or carbon molecular sieves are used for adsorption and separation of hydrocarbon-containing compounds because of the high affinity of hydrocarbons for these solids. Furthermore, the nature of their surface provides hydrophobic properties that can be used for example for water treatment. Finally, the adsorption capacity of carbon-containing microporous solids is generally higher than that of zeolite type molecular sieves, but their selectivity is lower because of a wider pore size distribution.

Because of the great diversity of activated charcoals (raw material used, activation process . . . ), there is no typical adsorption isotherm. However, on most activated charcoals, adsorption of water remains low, generally lower than 0.5 % by weight under a relative pressure of 0.01 at 25°C (Carrott et al., op.cit.). The adsorption isotherms are of V type in the classification, i.e. at a higher partial pressure, for a relative pressure above about 0.6, capillary condensation phenomena may occur and thus lead to a much greater water <<adsorption>>. Concerning methanol, which has a less hydrophilic character than water, the adsorption isotherms are generally of I type. On a AC-35 type activated charcoal, at 25°C and under a relative pressure of 0.5 (85mbar), the amount adsorbed is 32 % by weight, and under a relative pressure of 0.1, it is 16 % by weight (Mhiri et al., *Rev. Gen. Therm.*, 1996, 35, p.39).

The heat of adsorption of a hydrocarbon-containing compound such as n-hexane on an activated charcoal is of the order of 22 kcal/mol.

Regeneration of the activated charcoals containing water or methanol can be achieved at moderate temperature because the polar compounds are relatively weakly adsorbed.

The hydrocarbon compounds of the gas can also be adsorbed on activated charcoal.

Two examples are given hereafter to illustrate the two implementation examples given in FIGS. 1 and 2.

The gas to be dehydrated is a natural gas whose composition is given in the table hereafter:

| Compounds | Incoming gas (% by weight) | Incoming gas (kmol/h) | Incoming gas (kg/h) |
|---|---|---|---|
| Methanol | 0.00 | 0.00 | 0.00 |
| Water | 0.15 | 1.94 | 34.86 |
| Nitrogen | 1.73 | 14.39 | 402.80 |
| Carbon dioxide | 3.40 | 17.95 | 789.79 |
| Methane | 70.25 | 1020.03 | 16320.53 |
| Ethane | 11.55 | 89.42 | 2682.69 |
| Propane | 6.85 | 36.14 | 1590.29 |
| i-butane | 1.39 | 2.55 | 322.00 |
| n-butane | 2.27 | 9.09 | 527.50 |
| Pentane | 1.39 | 3.23 | 323.20 |
| C5+ | 1.02 | 3.66 | 238.00 |
| TOTAL | 100.00 | 1198.40 | 23231.66 |

The flow rate of the gas feed is 23,232 kg/h (1198 kmol/h), the pressure is 6.7 MPa and the temperature is 43°C (conditions corresponding to the gas introduced in the contact zone).

According to the conventional treatment, the molar flow rates of the gaseous effluent discharged and of the liquid hydrocarbon effluent (NGL) (11) recovered at the outlet of the cold drum (−26°C, 6.7 MPa) are as follows:

| Compounds | Discharged gas (kmol/h) | NGL line 11 (kmol/h) |
|---|---|---|
| Methanol | 0.1548 | 0.1533 |
| Water | 0.0126 | 0.0 |
| Nitrogen | 14.2175 | 0.1614 |
| Carbon dioxide | 16.8145 | 1.1309 |
| Methane | 990.2981 | 27.0002 |
| Ethane | 80.5086 | 8.7053 |
| Propane | 28.0681 | 7.9948 |
| i-butane | 3.1741 | 2.3659 |
| n-butane | 5.8094 | 3.2656 |
| i-/n-pentane | 1.6099 | 2.8701 |
| Hexane | 0.1217 | 0.5853 |
| Heptane | 0.1349 | 1.6321 |
| TOTAL | 1140.9244 | 55.8649 |

1st EXAMPLE Regeneration With The Processed Gas (FIG. 1)

In this example, the solvent-rich gas leaving cold drum 9 through line 12 is processed by adsorption on a silicalite type hydrophobic zeolite. The zeolite occurs in the form of 3.2-mm extrudates with a binder content of about 20 % by weight. The filling density is about 740 kg/m$^3$. The microporous volume available for adsorption is 0.152 cm$^3$/g.

Adsorption is performed at −26°C (Ta) under a pressure of 6.7 MPa.

The gas coming from the cold drum is sent to first adsorber $A_1$. After leaving this adsorber, 10 % of the solvent-depleted gas is sent through line 24 to second adsorber $A_2$ and used as scavenging gas for desorption of the second adsorber saturated with solvent during a previous adsorption cycle. These 10 % of the processed gas are heated by heat exchange in exchanger $E_1$, with the non-processed gas coming from the contact zone, which is at a temperature of 43°C. Regeneration is still performed under a pressure of 6.7 MPa, the temperature of the regeneration gas being 35°C after exchange.

The partial pressure of the water (11 ppm mol) and of the methanol (135 ppm mol) is 75 and 910 Pa respectively.

For a temperature of −26°C, a pressure of 6.7 MPa and at the concentrations given, the adsorption capacities of silicalite towards these compounds are 3.6 and 11.1 % by weight. Furthermore, under the same conditions, the i-/n-pentane cut is adsorbed up to about 50 %, and the $C_6$ and $C_7$ cuts are almost totally adsorbed. For the hydrocarbon-containing compounds, the adsorption capacity is close to 12 % by weight in silicalite. The lighter hydrocarbon compounds are not sufficiently adsorbed and they are displaced by the methanol and the heavy hydrocarbons present in the gas.

The total amount of adsorbable compounds is thus 87 kg/h.

Adsorbers $A_1$ and $A_2$ are designed to work with cycle times of 5 hours. The amount of material to be adsorbed is thus 435 kg. If we take 12 % by weight as the mean value for the adsorption capacity of silicalite, the amount of adsorbent required per adsorber is 3.63 tons, i.e. about 4.9 m$^3$.

The flow rate of the gas discharged is 1141 kmol/h, i.e. 25,574 Nm$^3$/h, i.e., under 6.7 MPa and at −26°C, 293.6 m$^3$/h. The velocity of flow of the gas in the adsorber must be less than 12 m/min, the diameter of the adsorber is 0.8 m. The height of the adsorber is 9.8 m.

Under such conditions, the gas produced and the NGL after stabilization have the following compositions:

| Compounds | Gas (kmol/h) | NGL (kmol/h) |
|---|---|---|
| Methanol | 0.0 | 0.0 |
| Water | 0.0126 | 0.1681 |
| Nitrogen | 14.2009 | 0.1780 |
| Carbon dioxide | 16.6886 | 1.2569 |
| Methane | 987.5173 | 29.7811 |
| Ethane | 79.6422 | 9.5717 |
| Propane | 27.3682 | 8.6947 |
| i-butane | 3.0204 | 2.5196 |
| n-butane | 5.5736 | 3.5014 |
| i-/n-butane | 0.8974 | 3.5826 |
| Hexane | 0.0 | 0.7070 |
| Heptane | 0.0 | 1.7670 |
| TOTAL | 1134.9212 | 61.7281 |

The proportion of NGL recovered according to this process is higher than in the base case by 10.5 %.

2nd EXAMPLE Regeneration With The Non-processed Gas (FIG. 3)

In this example, the gas leaving cold drum 9 is processed by adsorption on a silicalite type hydrophobic zeolite. The zeolite used occurs in the form of 3.2-mm extrudates with a binder content of about 20 % by weight. The filling density is about 740 kg/m$^3$. The microporous volume available for adsorption is 0.152 cm$^3$/g.

Adsorption in adsorber $A_1$ is performed at −26°C (Ta) under a pressure of 6.7 MPa.

Regeneration of second adsorber $A_2$ during a previous adsorption step (performed at a temperature substantially equal to −26°C) is carried out with the non-processed gas (a fraction of the non-processed raw gas), at a flow rate corresponding to 10 % of the flow of gas feeding adsorber $A_1$. Regeneration is still performed under a pressure of 6.7 MPa, but at a temperature of 43°C.

The partial pressure of the water (11 ppm mol) and of the methanol (135 ppm mol) is 0.075 and 0.91 kPa respectively. At −26°C and 6.7 MPa and at the concentrations indicated, the adsorption capacities of silicalite towards these compounds are 3.6 and 11.1 % by weight. Besides, under the same conditions, the i-/n-pentane cut is adsorbed up to about 50 %, and the $C_6$ and $C_7$ cuts are nearly totally adsorbed, with a proportion of 12 % by weight in the silicalite. The lighter hydrocarbon compounds are not sufficiently adsorbed and they are displaced by the methanol and the heavy hydrocarbons.

The total amount of adsorbable compounds is thus 87 kg/h.

Under these conditions, the gas produced and the NGL have the following compositions:

| Compounds | Gas (kmol/h) | NGL (kmol/h) |
|---|---|---|
| Methanol | 0.0 | 0.1682 |
| Water | 0.0125 | 0.0 |
| Nitrogen | 14.2009 | 0.1780 |
| Carbon dioxide | 16.6886 | 1.2569 |
| Methane | 987.5173 | 29.7811 |
| Ethane | 79.6423 | 9.5717 |
| Propane | 27.3682 | 8.6947 |
| i-butane | 3.0204 | 2.5196 |
| n-butane | 5.5736 | 3.5014 |
| i-/n-butane | 0.8974 | 3.6096 |
| Hexane | 0.0 | 0.7070 |
| Heptane | 0.0 | 1.7670 |
| TOTAL | 1134.9213 | 61.7282 |

The NGL content is higher than in the base case by 10.5 %.

What is claimed is:

1. A process for recovering a solvent from a gas coming from a treating process using said solvent, the treating process allowing to obtain the gas at two different temperatures, a low temperature Ta and a high temperature Td, so that the temperature difference Td-Ta is sufficient to perform an adsorption step and a desorption step, characterized in that:
    a) a first solvent-containing gas stream is sent to an adsorption step, said gas being at a temperature Ta, at the end of this adsorption step the gas is practically solvent-free and the solvent is collected in a first adsorption means,
    b) a second gas stream at a temperature Td is sent, said second gas stream being solvent-free, to carry out desorption of a second adsorption means loaded with solvent during a previous step a), and
    c) said solvent is recovered and sent at least partly to a step of the treating process using the solvent.

2. A recovery process as claimed in claim 1, characterized in that said second gas stream consists of at least part of the gas from step a), said gas having been heated by heat exchange with at least part of the gas to be processed so as to bring its initial temperature close to Ta to a temperature substantially equal to Td.

3. A recovery process as claimed in claim 1, characterized in that said second gas stream consists of part of the gas to be processed, diverted prior to being subjected to the solvent treating process.

4. A recovery process as claimed in claim 1 characterized in that a preheating step is carried out to obtain temperature Td.

5. A solvent recovery process integrated in a natural gas treating process using a solvent during which the natural gas loads with solvent and can be at two temperatures Ta and Td, characterized in that it comprises at least the following steps:
    a) the gas to be processed is contacted with a mixture comprising at least one solvent and a solvent-enriched gas is obtained at the end of this step,
    b) said solvent-enriched gas is sent to a refrigeration step in order to bring its temperature to a temperature Ta,
    c) said solvent-enriched gas at a temperature Ta is sent to an adsorption step in a first adsorption means at the outlet of which a practically solvent-free gas is obtained,
    d) a step of desorption of a second adsorption means already loaded during a previous adsorption step is carried out by sending a practically solvent-free gas stream at a temperature Td, the temperature difference between Ta and Td being sufficient to carry out the desorption step so as to recover the solvent,
    e) the solvent recovered is sent to a step of the gas treating process.

6. A process as claimed in claim 5, characterized in that said gas stream used in step d) is withdrawn before contacting step a) and the gas from step a) is discharged after being used to cool the solvent-rich gas to a temperature substantially close to Ta.

7. A process as claimed in claim 5, characterized in that said gas stream used in step d) corresponds to a fraction of the gas from adsorption step c), said gas having been heated to a temperature Td by heat exchange with the solvent-rich gas.

8. A process as claimed in claim 5, characterized in that steps c) and d) are carried out at a pressure value ranging between 0 and 20 MPa.

9. A process as claimed in claim 5, characterized in that temperature Td is obtained by using additional heating means.

10. A process as claimed in claim 5 characterized in that all of the solvent recovered is sent with the gas to a step of the treating process.

11. A process as claimed claim 5, characterized in that a solvent allowing dehydration of a natural gas is used, dehydration of the natural gas is performed and a mixture of solvent recovered and of natural gas is reinjected before heat exchange.

12. A process as claimed in claim 5, characterized in that the first and second adsorption means comprise an adsorbent selected from the group consisting of silicate, Y type zeolites, a hydrophobic sieve or activated charcoal are used.

13. Application of the process as claimed in claim 5, to recovery of a solvent contained in a gas, the concentration of said solvent being up to 500ppm.

14. Application of the process as claimed in claim 5 to recovery of a solvent contained in a gas, the concentration of said solvent being up to 200 ppm.

15. A process as claimed in claim 5, characterized in that steps c) and d) are carried out at a pressure value ranging between 3 and 10 Mpa.

16. A process as claimed in claim 5, characterized in that temperature Ta is selected in the range of −60 to 25°C.

17. A process as claimed in claim 5, characterized in that temperature Ta is selected in the range of −30 to 0°C.

18. A process as claimed in claim 5, characterized in that temperature Td is selected in the range of 0 to 100°C.

19. A process as claimed in claim 5, characterized in that temperature Td is selected in the range of 25 to 50°C.

* * * * *